US009288060B1

(12) United States Patent
Jonsson

(10) Patent No.: US 9,288,060 B1
(45) Date of Patent: Mar. 15, 2016

(54) SYSTEM AND METHOD FOR DECENTRALIZED AUTHENTICATION OF SUPPLICANT DEVICES

(71) Applicant: Dell Software Inc., Aliso Viejo, CA (US)

(72) Inventor: Jan Henrik Jonsson, Laguna Beach, CA (US)

(73) Assignee: Dell Software Inc., Aliso Viejo, CA (US)

( * ) Notice: Subject to any disclaimer, the term of this patent is extended or adjusted under 35 U.S.C. 154(b) by 63 days.

(21) Appl. No.: 14/073,823

(22) Filed: Nov. 6, 2013

(51) Int. Cl.
G06F 21/00 (2013.01)
H04L 9/32 (2006.01)

(52) U.S. Cl.
CPC .................................. *H04L 9/3247* (2013.01)

(58) Field of Classification Search
CPC ................. H04L 9/3247; G06F 21/36; G06F 2221/2153
See application file for complete search history.

(56) References Cited

U.S. PATENT DOCUMENTS

| 7,314,167 | B1 * | 1/2008 | Kiliccote | G06Q 20/04 235/380 |
| 7,523,315 | B2 * | 4/2009 | Hougaard et al. | 713/176 |
| 8,261,089 | B2 * | 9/2012 | Leon Cobos et al. | 713/185 |
| 8,272,038 | B2 * | 9/2012 | Husemann et al. | 726/3 |
| 2009/0288159 | A1 * | 11/2009 | Husemann et al. | 726/16 |
| 2010/0070759 | A1 * | 3/2010 | Leon Cobos et al. | 713/155 |
| 2010/0100945 | A1 * | 4/2010 | Ozzie et al. | 726/5 |
| 2010/0241857 | A1 * | 9/2010 | Okude et al. | 713/168 |
| 2011/0219427 | A1 * | 9/2011 | Hito et al. | 726/3 |
| 2012/0284602 | A1 * | 11/2012 | Seed et al. | 715/224 |
| 2013/0111208 | A1 * | 5/2013 | Sabin et al. | 713/171 |
| 2013/0167208 | A1 * | 6/2013 | Shi | 726/5 |
| 2013/0173915 | A1 * | 7/2013 | Haulund | 713/159 |
| 2013/0185210 | A1 * | 7/2013 | Dodson et al. | 705/44 |
| 2013/0219479 | A1 * | 8/2013 | DeSoto et al. | 726/6 |
| 2013/0226813 | A1 * | 8/2013 | Voltz | 705/67 |
| 2013/0283341 | A1 * | 10/2013 | Park | H04L 63/102 726/1 |
| 2014/0025582 | A1 * | 1/2014 | Maevsky | 705/65 |
| 2014/0068719 | A1 * | 3/2014 | Kiukkonen et al. | 726/4 |
| 2015/0089610 | A1 * | 3/2015 | DeSoto | H04W 12/06 726/6 |

* cited by examiner

*Primary Examiner* — Taghi Arani
*Assistant Examiner* — Sharon Lynch
(74) *Attorney, Agent, or Firm* — Winstead PC

(57) ABSTRACT

In one embodiment, a method includes enrolling a supplicant device as an authentication factor for a user. The enrolling includes storing a public key of an asymmetric key pair generated by an authentication application on the supplicant device. The method also includes receiving, from an access device, a request to access a service using an identity of the user. In addition, the method includes, responsive to the receiving, publishing an authentication code to the access device. The method further includes receiving an authentication package from the authentication application without contacting the authentication application. The authentication package includes a digital signature of the authentication code. The method additionally includes validating the digital signature using the public key. Moreover, the method includes, responsive to a determination that the validating is successful, allowing the access device to access the service.

12 Claims, 5 Drawing Sheets

SYSTEM AND METHOD FOR DECENTRALIZED AUTHENTICATION OF SUPPLICANT DEVICES

BACKGROUND

1. Technical Field

The present invention relates generally to data security and more particularly, but not by way of limitation, to systems and methods for decentralized authentication of supplicant devices.

2. History of Related Art

Most of today's authentication methods depend upon centralized storage of private user-authentication data. For example, some entities implement a symmetric encryption algorithm and, as a result, rely upon a shared secret to authenticate users. Generally, such entities are responsible for storing shared secrets across all users. Many other authentication methods require a similar central repository. Therefore, even a single data breach can result in a massive loss of private user-authentication data. This private user-authentication data can be used, for example, by identity thieves, to impersonate users and conduct unauthorized transactions.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on an authenticator computer system, enrolling a supplicant device as an authentication factor for a user. The enrolling includes storing a public key of an asymmetric key pair generated by an authentication application on the supplicant device. The method also includes the authenticator computer system receiving, from an access device, a request to access a service using an identity of the user. In addition, the method includes, responsive to the receiving, the authenticator computer system publishing an authentication code to the access device. The method further includes the authenticator computer system receiving an authentication package from the authentication application without contacting the authentication application. The authentication package includes a digital signature of the authentication code. Moreover, the method includes the authenticator computer system validating the digital signature using the public key. The method additionally includes, responsive to a determination that the validating is successful, the authenticator computer system allowing the access device to access the service.

In one embodiment, an information handling system includes at least one processing unit. The at least one processing unit is operable to implement a method. The method includes enrolling a supplicant device as an authentication factor for a user. The enrolling includes storing a public key of an asymmetric key pair generated by an authentication application on the supplicant device. The method also includes receiving, from an access device, a request to access a service using an identity of the user. In addition, the method includes, responsive to the receiving, publishing an authentication code to the access device. The method further includes receiving an authentication package from the authentication application without contacting the authentication application. The authentication package includes a digital signature of the authentication code. The method additionally includes validating the digital signature using the public key. Moreover, the method includes, responsive to a determination that the validating is successful, allowing the access device to access the service.

In one embodiment, a computer-program product includes a non-transitory computer-usable medium having computer-readable program code embodied therein. The computer-readable program code is adapted to be executed to implement a method. The method includes enrolling a supplicant device as an authentication factor for a user. The enrolling includes storing a public key of an asymmetric key pair generated by an authentication application on the supplicant device. The method also includes receiving, from an access device, a request to access a service using an identity of the user. In addition, the method includes, responsive to the receiving, publishing an authentication code to the access device. The method further includes receiving an authentication package from the authentication application without contacting the authentication application. The authentication package includes a digital signature of the authentication code. The method additionally includes validating the digital signature using the public key. Moreover, the method includes, responsive to a determination that the validating is successful, allowing the access device to access the service.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
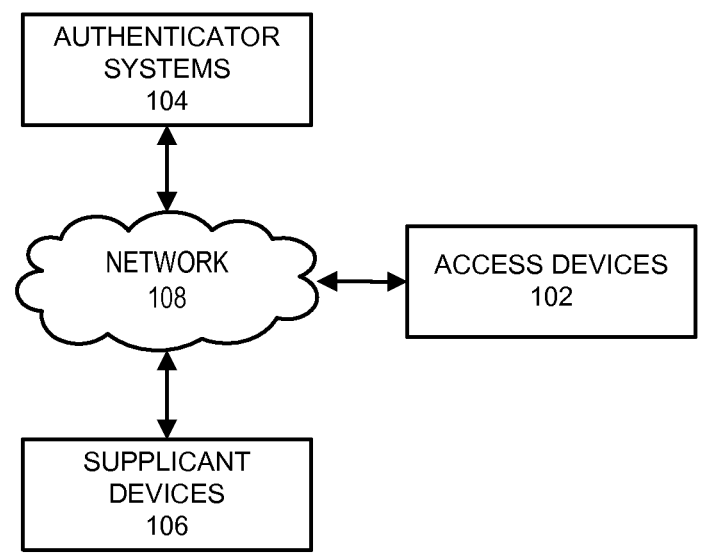
FIG. 1 illustrates a networked computing environment.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In various embodiments, user authentication can be improved using systems and methods for decentralized authentication as described herein. In various embodiments, users are permitted to enroll one or more supplicant devices to serve as an authentication factor for each of one or more authenticator systems. A user, as used herein, is a person or entity that has registered with a system providing a service and has been awarded an identity within the system. The identity can include, for example, a name, log-in credentials, and/or other information or factors that can contribute, in whole or in part, to unique identification of users.

An authenticator system, as used herein, is an information handling system that uses one or more authentication factors to authenticate users of a service when, for example, attempts are made to access the service using those users' identities. The service can be, for example, access to a software application, data, or resource, performance of one or more tasks, and/or the like. The service may be provided by the authenticator system or, for example, another system in communication with the authenticator system. An authentication factor, as used herein, is a way of validating a user and/or information associated with the user. For example, in various embodiments, an authenticator system can authenticate, as an authentication factor, a pre-designated supplicant device as a prerequisite to providing access to a service using a given user's identity.

An access device, as used herein, is an information handling system via which a user (or one impersonating a user) attempts to access a service. A supplicant device, as used herein, is an information handling system that is to be used as an authentication factor when authenticating a user, for example, as a result of the device having been so designated and enrolled by a user. In a typical embodiment, supplicant devices, rather than authenticator systems or any third-party system, can store any private user-authentication data that is relied upon to support their use as an authentication factor. For purposes of this patent application, private user-authentication data refers to data used to carry out an authentication factor that is not intended for public distribution such as, for example, private keys, shared secrets, etc. In this fashion, users can remain in control of their private user-authentication data and mitigate their loss if, for example, a massive data breach occurs at authenticator systems with which the users interact. User-authentication data that is not private user-authentication data may be periodically referenced herein as public user-authentication data.

FIG. 1 illustrates a networked computing environment 100. The networked computing environment 100 includes authenticator systems 104, access devices 102, and supplicant devices 106. The authenticator systems 104, the access devices 102, and the supplicant devices 106 are connected over a network 108 such as, for example, the Internet.

In general, the authenticator systems 104 are each operable to serve a gatekeeping function with respect to at least one service provided over the network 108. In certain embodiments, some or all of the authenticator systems 104 are further operable to provide the at least one service. For example, a particular authentication system of the authenticator systems 104 could be associated with a bank that provides online banking services to its users. In these embodiments, the bank's computing systems could encompass both the particular authentication system and computer systems associated with providing the online banking services. In other embodiments, some or all of the authenticator systems 104 could be logically and/or physically separate from computer systems that provide the at least one service.

The access devices 102 and the supplicant devices 106 are illustrative of a logical division between devices that attempt to access a service and devices that are employed as an authentication factor prior to service access being provided. It should be appreciated, however, that a given device can be both one of the access devices 102 and one of the supplicant devices 106. For example, a given user could enroll a given information handling system as one of the supplicant devices 106 and then also use that information handling system as one of the access devices 102 for purposes of accessing the service.

Each of the supplicant devices 106 is typically enrolled, by a user, as an authentication factor for one or more of the authenticator systems 104. In this manner, whenever attempts are made to access a service using the user's identity, authentication of a corresponding supplicant device of the supplicant devices 106 can be performed. As illustrated, the networked computing environment 100 can support a many-to-many relationship between the supplicant devices 106 and the authenticator systems 104. That is, a given supplicant device of the supplicant devices 106 can be enrolled as an authentication factor for multiple ones of the authenticator systems 104. Likewise, a given authenticator system of the authenticator systems 104 can enroll a supplicant device of the supplicant devices 106 as an authentication factor for each of multiple users. In a typical embodiment, the authenticator systems 104 and the supplicant devices 106 all support a common protocol for performing user authentication. Examples of the common protocol will be described in greater detail with respect to FIGS. 2A-4.

Figure 2A:
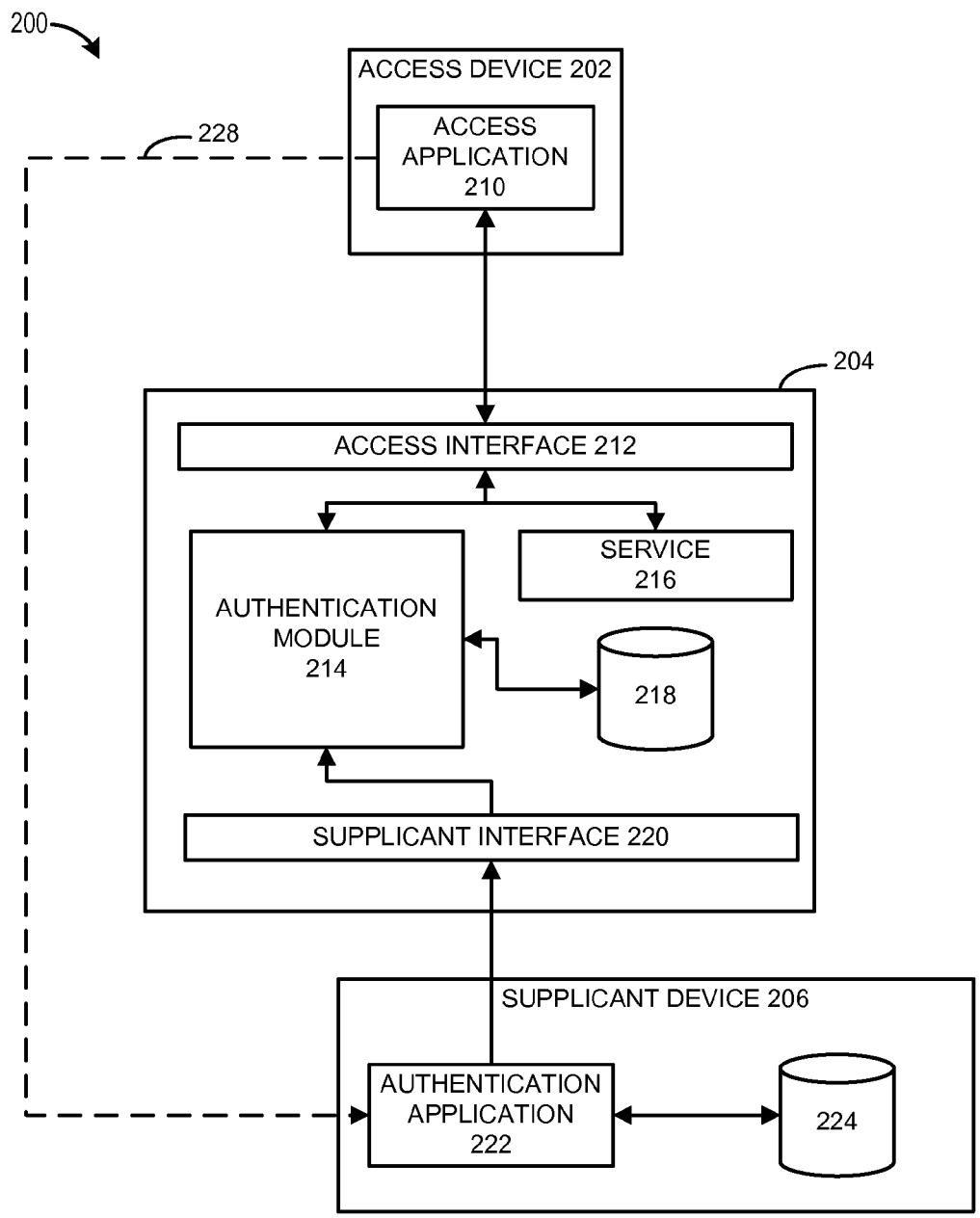
FIG. 2A illustrates an authentication environment.

FIG. 2A illustrates an authentication environment 200. The authentication environment 200 includes an access device 202, an authenticator system 204, and a supplicant device 206. For simplicity of description, the access device 202, the authenticator system 204, and the supplicant device 206 are illustrated singly in FIG. 2A. However, it should be appreciated that, as described with respect to FIG. 1, each can support a multiplicity of interactions with multiple other such devices.

The authenticator system 204 includes an access interface 212, an authentication module 214, an authenticator data store 218, and a supplicant interface 220. In a typical embodiment, the authenticator system 204 is operable to safeguard and/or provide access to a service 216, for example, by the access device 202 over the access interface 212. The access interface 212 can be representative, for example, of a web interface accessed via a uniform resource locator (URL).

The authentication module 214 is typically a software module that is operable to enroll, at a user's direction, the supplicant device 206 as an authentication factor for that user. During enrollment, the authentication module 214 typically stores only public user-authentication data for the user in the authenticator data store 218. The authenticator data store 218 can be, for example, a database, a flat file, etc. For example, in certain embodiments, the authentication module 214 receives and stores in the authenticator data store 218 a public key of an asymmetric key pair. In a typical embodiment, the authentication module 214 never receives or stores any private user-authentication data such as, for example, a private key of an asymmetric key pair. Once the supplicant device 206 is enrolled, the authentication module 214 is operable to authenticate the supplicant device 206 over the supplicant interface 220 whenever, for example, a request to access the service 216 using the user's identity is received from the access device 202. In similar fashion to the access interface 212, the supplicant interface 220 can be representative, for example, of a web interface accessed via a URL.

The supplicant device 206 includes an authentication application 222 and a supplicant data store 224. The authentication application 222 is typically a software application that is operable to support authentication by one or more authenticator systems such as the authenticator system 204. The authentication application 222 can be, for example, a platform-specific native application that executes on the supplicant device 206. During enrollment of the supplicant device 206, the authentication application 222 typically generates public and private user-authentication data (e.g., an asymmetric key pair) and stores at least the private user-authentication data (e.g., a private key) in the supplicant data store 224. The supplicant data store 224 can be, for example, a database, a flat file, etc. The supplicant data store 224 can also be encrypted using, for example, one or more symmetric or asymmetric encryption algorithms.

The access device 202 includes an access application resident 210 and executing thereon. In a typical embodiment, the access application 210 is representative of any software application that can be used to access the service 216. The access application 210 can be software application such as, for example, a web-browser application. In certain embodiments, the access application 210 can be a platform-specific native application for the access device 202.

In certain embodiments, different from conventional authentication systems, the authenticator system 204 does not need to issue a request to, send any data to, or otherwise directly contact the authentication application 222 for purposes of enrollment or authentication. Rather, the authentication environment 200 utilizes a loop-back path 228 from the access application 210 to the authentication application 222. The loop-back path 228 is generally used to notify the authentication application 222 of what information the authenticator system 204 has requested and of a network location of the supplicant interface 220 (e.g., a URL). Subsequently, the authentication application 222 can provide the requested information directly to the authenticator system 204 via the supplicant interface 220. Examples of the loop-back path 228 will be described in greater with respect to FIGS. 2B-4.

Figure 2B:
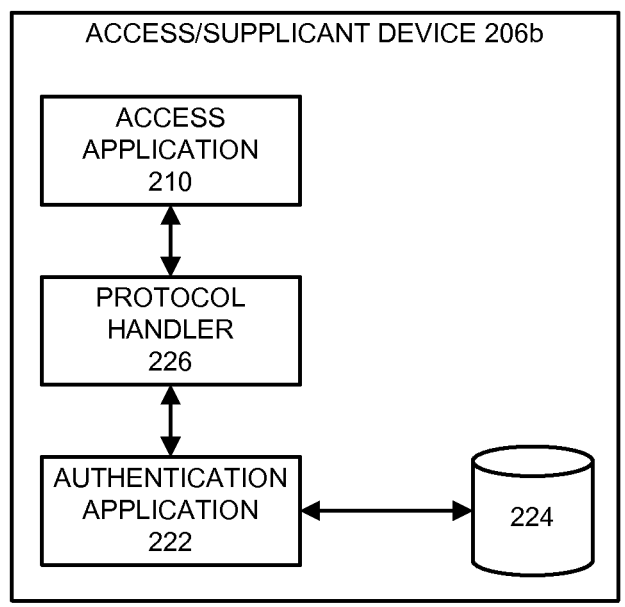
FIG. 2B illustrates an access/supplicant device.

FIG. 2B illustrates an access/supplicant device 206b such that the access/supplicant device 206b serves as both the access device 202 and the supplicant device 206 of FIG. 2A. The access/supplicant device 206b further includes a protocol handler 226 that, in various embodiments, can facilitate the loop-back path 228 of FIG. 2A. As illustrated, the authentication application 222 can register with the protocol handler 226 so that, for example, URLs of a certain form will be directed thereto. For example, if the access application 210 received a URL of the form "asymmetric://," such URLs could be directed to the authentication application 222 and used to provide data to the authentication application 222.

Figure 3:
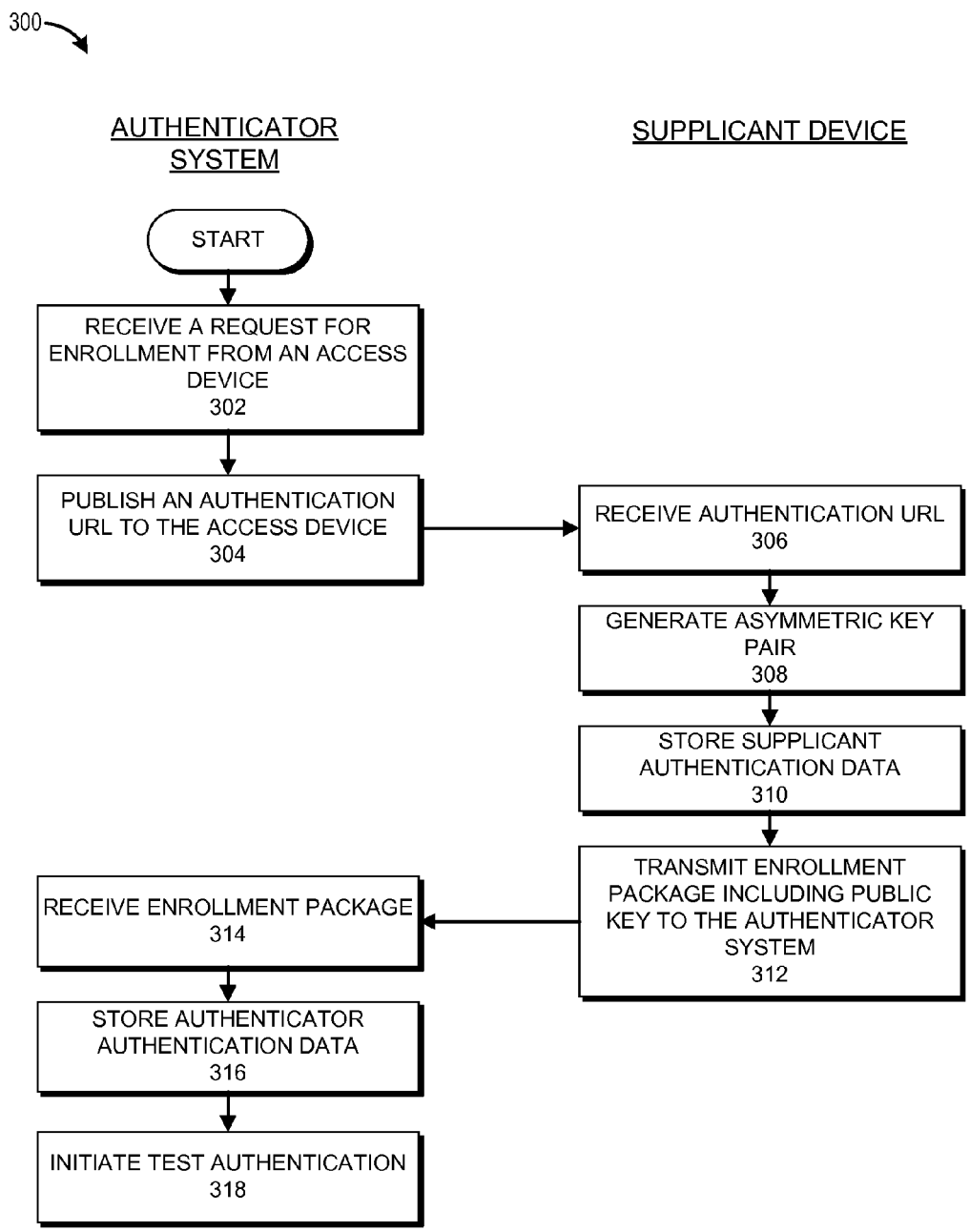
FIG. 3 illustrates a process for enrolling a supplicant device with an authenticator system.

FIG. 3 presents a flowchart of an example of a process 300 for enrolling a supplicant device with an authenticator system. The process 300 can be implemented by any system that can receive and verify data. For example, the process 300, in whole or in part, can be implemented by one or more of the access device 202, the authenticator system 204, the supplicant device 206, and/or the access/supplicant device 206b (or components thereof). Although any number of systems, in whole or in part, can implement the process 300, to simplify discussion, the process 300 will be described in relation to specific systems or subsystems of the authentication environment 200 of FIG. 2A.

At block 302, the authenticator system 204 receives a request for enrollment from the access device 202 via the access interface 212. For ease of description, the access device 202 in its role of requesting enrollment may be periodically referenced herein as an enrollment device. In a typical embodiment, the request for enrollment is initiated by a user of the service 216. At block 304, the authenticator system 204 publishes an authentication URL to the access device 202. For example, the authentication URL can be a network location of the supplicant interface 220. Publishing the authentication URL can involve, for example, causing the access application 210 to display the authentication URL on the access device 202. In certain embodiments, the authentication URL may be published as a quick response (QR) code. In other embodiments, as described with respect to FIG. 2B, the authentication URL may be published as a link that includes the authentication URL and is in a format expected by the protocol handler 226 as relating to the authentication application 222.

At block 306, the authentication application 222 on the supplicant device 206 receives the authentication URL via, for example, the loop-back path 228. In a typical embodiment, the user initiates the receipt, for example, by opening the authentication application 222 and indicating a desire to add the authenticator system 204 as an authentication source. In certain embodiments, how the supplicant device 206 receives the authentication URL, and the nature of the loop-back path 228, can be varied based on how the authentication URL is published.

For example, if the authentication URL is caused to be displayed on the access device 202, the loop-back path 228 can include the user viewing the authentication URL on the access device 202 and manually entering the authentication URL responsive to a prompt. By way of further example, if the authentication URL is published as a QR code, the loop-back path 228 can include the authentication application 222 initiating a scan of the QR code using an imaging component (e.g. a camera) of the supplicant device 206. Additionally, in cases where the supplicant device 206 and the access device 202 are a same device (e.g., the access/supplicant device 206b), the loop-back path 228 can include the user selecting a link provided on the access application 210, the protocol handler 226 recognizing the link as relating to the authentication application 222, and the protocol handler 226 providing the link to the authentication application 222.

At block 308, the authentication application 222 on the supplicant device 206 generates an asymmetric key pair with respect to the authenticator system 204 using an encryption algorithm such as RSA, DSA, ECDSA, variants thereof, and/or the like. The asymmetric key pair generally includes a public key and a private key. In some embodiments, the supplicant device 206 may utilize a single asymmetric key pair for the user with respect to all authenticator systems, inclusive of the authenticator system 204. In these embodiments, if the single asymmetric key pair has already been generated, the block 308 can be omitted.

At block 310, the authentication application 222 on the supplicant device 206 stores supplicant authentication data in the supplicant data store 224. The supplicant authentication data typically includes the asymmetric key pair, the authentication URL, and an identifier for the authenticator system 104. In a typical embodiment, the private key of the asymmetric key pair represents private user-authentication data that, by intention, is not shared with the authenticator system 204 or any third-party system. In certain embodiments, the supplicant data store 224 can represent encrypted storage of all or part of the supplicant authentication data (e.g., the private user-authentication data). In embodiments in which the single asymmetric key pair is utilized for all authenticator systems, the asymmetric key pair can be stored once for all such authenticator systems rather than separately for each authenticator system as described above.

At block 312, the authentication application 222 on the supplicant device 206 transmits an enrollment package to the authenticator system 204 using the authentication URL. The enrollment package typically includes at least the public key of the asymmetric key pair but does not include any private user-authentication data such as, for example, the private key of the asymmetric key pair. The enrollment package can also identify the enrollment request to which the enrollment package relates, for example, by including an identifier for the enrollment request, the user, the access device 202, and/or the like. At block 314, the authenticator system 204 receives the enrollment package via the supplicant interface 220.

At block 316, the authentication module 214 on the authenticator system 204 stores authenticator authentication data for the user in the authenticator data store 218. The authenticator authentication data typically includes the public key of the asymmetric key pair, an identifier for the user, etc. At block 318, in some embodiments, the authentication module 214 on the authenticator system 204 performs a test authentication to confirm that enrollment was successful. For example, a process similar to the process described below with respect to FIG. 4 can be performed. In other embodiments, the block 318 can be omitted.

Figure 4:
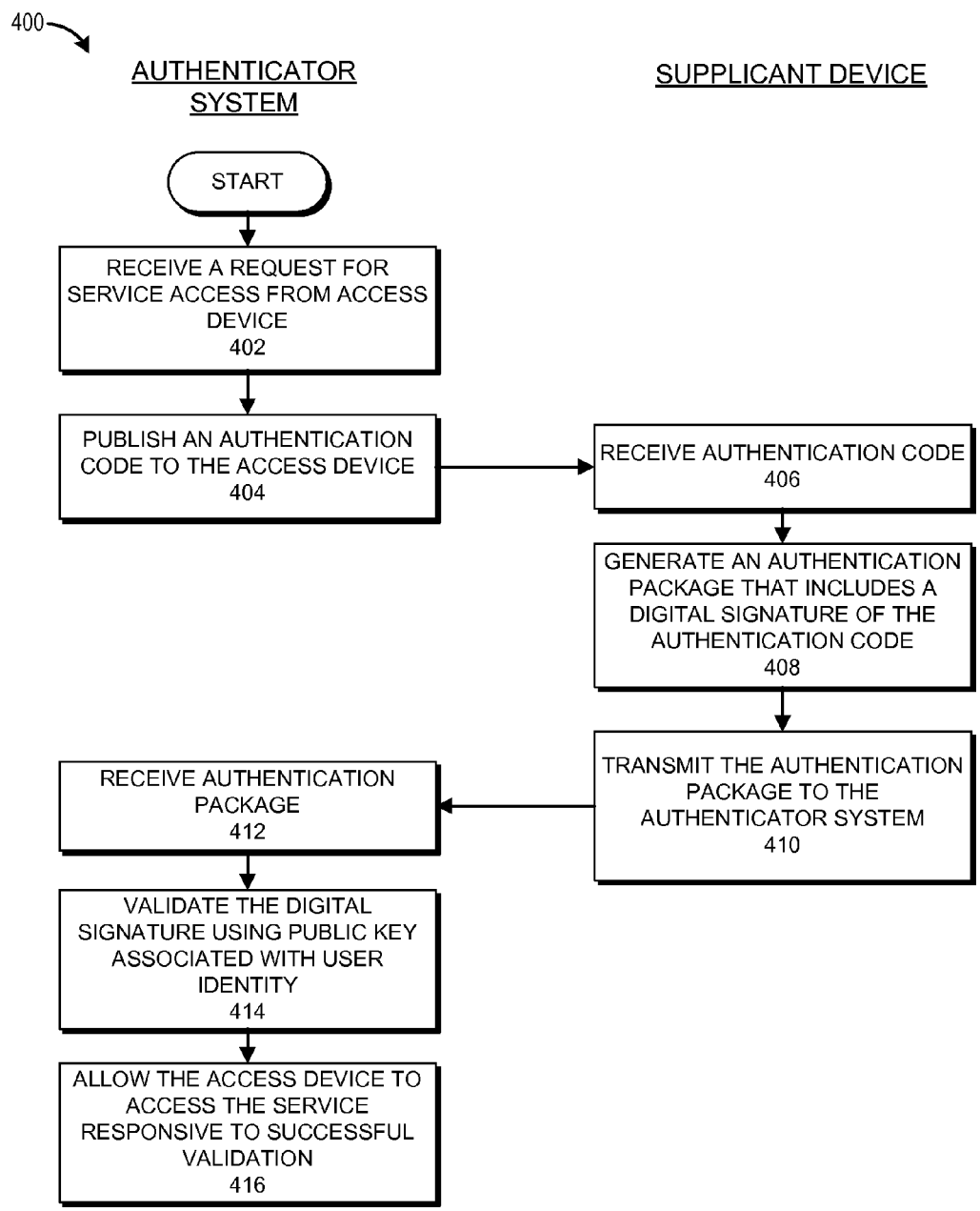
FIG. 4 illustrates a process for performing authentication of a supplicant device.

FIG. 4 presents a flowchart of an example of a process 400 for performing authentication of a supplicant device. In various embodiments, the process 400 is performed after an enrollment process such as, for example, the process 300 of FIG. 3, has previously occurred. The process 400 can be implemented by any system that can receive and verify data. For example, the process 400, in whole or in part, can be implemented by one or more of the access device 202, the authenticator system 204, the supplicant device 206, and/or the access/supplicant device 206b (or components thereof). Although any number of systems, in whole or in part, can implement the process 400, to simplify discussion, the process 400 will be described in relation to specific systems or subsystems of the authentication environment 200 of FIG. 2A.

At block 402, the authenticator system 204 receives a request for access to the service 216 from the access device 202 via the access interface 212. In a typical embodiment, the request for service access is made with respect to an identity of the user. For example, the request may be made via an attempt to log-in using the user's credentials (e.g., user name and password). At block 404, the authenticator system 204 publishes an authentication code to the access device. The authentication code can include, or be accompanied by, an identifier for the authenticator system 204. In a typical embodiment, the authentication code can be published using any of the methods described above with respect to the authentication URL. The authentication code, however, is typically a pseudo-random alphanumeric code generated by the authenticator system 204 at or around a time of receiving the request for service access.

At block 406, the authentication application 222 on the supplicant device 206 receives the authentication code (and any identifier for the authenticator system 204) via the loop-back path 228. In general, the loop-back path 228 can include any of the methods described above with respect to the authentication URL. At block 408, the authentication application on the supplicant device 206 generates an authentication package. In a typical embodiment, the authentication package includes the authentication code digitally signed using a private key that the supplicant device 206 associates with the authenticator system 204 (i.e., a digital signature of the authentication code). For example, the authentication code can be digitally signed using the private key generated at the block 308 of FIG. 3.

At block 410, the authentication application 222 on the supplicant device 206 transmits the authentication package to the authenticator system 204 using an authentication URL that the supplicant device 206 associates with the authenticator system 204. For example, the supplicant device 206 can retrieve and use the authentication URL stored in the supplicant data store 224 at the block 310 of FIG. 3. At block 412, the authenticator system 204 receives the authentication package via the supplicant interface 220.

At block 414, the authentication module 214 on the authenticator system 204 validates the digital signature using a public key associated with the user's identity. For example, the authenticator module 214 can retrieve and use the public key stored during enrollment at the block 316 of FIG. 3. At block 416, the authenticator system 204 allows the access device 202 to access the service 216 responsive to successful validation of the supplicant device 206 at the block 414. Successful validation generally means that the authenticator system 204 has confirmed, via the public key, that the authentication code was digitally signed by the private key of the supplicant device 206. Otherwise, the access device 202 is denied access to the service 216.

In various embodiments, decentralized user authentication as described above can yield numerous benefits. For example, when the systems and methods described above are utilized, there is typically no central storage of private user-authentication data such as, for example, private keys of asymmetric key pairs. Rather, such private user-authentication data is stored on the supplicant device 206 under the control of the user. Therefore, a data breach at the authenticator system 204 would not result in such private user-authentication data being compromised.

In addition, in a typical embodiment, no central system needs to communicate with the supplicant device 206 either to enroll the supplicant device 206 as an authentication factor or to authenticate the supplicant device 206. Rather, the loop-back path 228 is utilized, which path does not typically involve any communication with a centralized system. In various embodiments, the loop-back path 228 only includes communication with devices that, presumably, are under control of the user such as, for example, the access device 202. Therefore, if, for example, a developer of the authentication application 222 were to go out of business, authentication and enrollment processes as described above could continue due to the lack of reliance on any central authentication service.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
on an authenticator computer system comprising an access device interface, an authentication module, a database, and a supplicant device interface, enrolling a supplicant device as an authentication factor for a user;
wherein the enrolling comprises receiving a first request for enrollment from the access device, publishing an authentication uniform resource locator (URL) to the access device, storing a public key of an asymmetric key pair generated by an authentication application on the supplicant device and receiving an enrollment package comprising the public key from the supplicant device via the authentication URL;
wherein the publishing of the authentication URL comprises causing a quick response (QR) code comprising the authentication URL to be displayed on the access device;
the authenticator computer system receiving, from an access device, a second request to access a service using an identity of the user;
responsive to the receiving, the authenticator computer system publishing an authentication code to the access device comprising the authentication URL;
wherein the authentication code is forwarded from the access device to the supplicant device via a loop-back communication path;
the authenticator computer system receiving an authentication package from the authentication application on the supplicant device using the authentication URL, the authentication package comprising a digital signature of the authentication code;
the authenticator computer system validating the digital signature using the public key;
responsive to a determination that the validating is successful, the authenticator computer system allowing the access device to access the service.

2. The method of claim 1, wherein the authentication package is received via the authentication URL.

3. The method of claim 1, wherein the publishing of the authentication code comprises causing a quick response (QR) code comprising the authentication code to be displayed on the access device.

4. The method of claim 1, comprising performing a test authentication.

5. The method of claim 1, wherein:
the publishing of the authentication code comprises causing a link comprising the authentication code to be displayed on the access device;
wherein the authentication application is registered with a protocol handler resident on the access device; and
wherein the link comprises a format that the protocol handler associates with the authentication application.

6. An information handling system comprising:
at least one processor and memory, wherein the at least one processor is operable to:
enroll a supplicant device as an authentication factor for a user by receiving a first request for enrollment from an access device, publishing an authentication uniform resource location (URL) to the access device, storing a public key of an asymmetric key pair generated by an authentication application on the supplicant device and receiving an enrollment package comprising the public key from the supplicant device via the authentication URL;
wherein the publishing of the authentication URL comprises a quick response (QR) code comprising the authentication URL to be displayed on the access device;
receive, from an access device, a second request to access a service using an identity of the user;
in response to receipt of the first request, publish an authentication code to the access device comprising the authentication URL; wherein the authentication code is forwarded from the access device to the supplicant device via a loop-back communication path;
receive an authentication package from the authentication application on the supplicant device using the authentication URL, the authentication package comprising a digital signature of the authentication code;
validate the digital signature using the public key; and
responsive to a determination that the validation is successful, allow the access device to access the service.

7. The information handling system of claim 6, wherein the authentication package is received via the authentication URL.

8. The information handling system of claim 6, wherein the publishing of the authentication code comprises causing a quick response (QR) code comprising the authentication code to be displayed on the access device.

9. The information handling system of claim 6, wherein the at least one processor is configured to perform a test authentication.

10. The information handling system of claim 9, wherein:
the publishing of the authentication code comprises causing a link comprising the authentication code to be displayed on the access device;
wherein the authentication application is registered with a protocol handler resident on the access device; and
wherein the link comprises a format that the protocol handler associates with the authentication application.

11. A computer-program product comprising a non-transitory computer-usable medium having computer-readable program code embodied therein, the computer-readable program code adapted to be executed to implement a method comprising:
enrolling, with an authenticator computer system comprising an access device interface, an authentication module, a database, and a supplicant device interface, a supplicant device as an authentication factor for a user;
wherein the enrolling comprises receiving a first request for enrollment from the access device, publishing an authentication uniform resource location (URL) to the access device, storing a public key of an asymmetric key pair generated by an authentication application on the supplicant device and receiving an enrollment package comprising the public key from the supplicant device via the authentication URL;
wherein the publishing of the authentication URL comprises causing a quick response (QR) code comprising the authentication URL to be displayed on the access device;
receiving, from an access device, a first request to access a service using an identity of the user;
responsive to the receiving, publishing an authentication code comprising the authentication URL to the access device;

wherein the authentication code is forwarded from the access device to the supplicant device via a loop-back communication path;

receiving an authentication package from the authentication application on the supplicant device using the authentication URL, the authentication package comprising a digital signature of the authentication code;

validating the digital signature using the public key; and responsive to a determination that the validating is successful, allowing the access device to access the service.

12. The computer-program product of claim 11, wherein the authentication package is received via the authentication URL.

* * * * *